United States Patent
D'Acquisto et al.

(10) Patent No.: US 12,395,741 B2
(45) Date of Patent: Aug. 19, 2025

(54) WILDLIFE CAMERA WITH OPTICAL ZOOM CAPABILITY

(71) Applicants: Andrae D'Acquisto, Bellevue, IA (US); Ralph Joseph Mancini, Danbury, CT (US)

(72) Inventors: Andrae D'Acquisto, Bellevue, IA (US); Ralph Joseph Mancini, Danbury, CT (US)

( * ) Notice: Subject to any disclaimer, the term of this patent is extended or adjusted under 35 U.S.C. 154(b) by 108 days.

(21) Appl. No.: 17/300,964

(22) Filed: Jan. 3, 2022

(65) Prior Publication Data
US 2023/0115596 A1    Apr. 13, 2023

Related U.S. Application Data

(60) Provisional application No. 63/360,543, filed on Oct. 12, 2021.

(51) Int. Cl.
| | |
|---|---|
| *H04N 23/69* | (2023.01) |
| *H04N 7/18* | (2006.01) |
| *H04N 23/54* | (2023.01) |
| *H04N 23/66* | (2023.01) |
| *H04N 23/695* | (2023.01) |

(52) U.S. Cl.
CPC .............. *H04N 23/69* (2023.01); *H04N 7/183* (2013.01); *H04N 23/54* (2023.01); *H04N 23/66* (2023.01); *H04N 23/695* (2023.01)

(58) Field of Classification Search
None
See application file for complete search history.

(56) References Cited

U.S. PATENT DOCUMENTS

| | | | | |
|---|---|---|---|---|
| 11,134,221 | B1* | 9/2021 | Brown | G01S 5/16 |
| 2004/0233282 | A1* | 11/2004 | Stavely | G08B 13/19663 |
| | | | | 348/154 |
| 2007/0242134 | A1* | 10/2007 | Zernov | B63G 8/001 |
| | | | | 348/81 |
| 2008/0316117 | A1* | 12/2008 | Hill | H01Q 13/10 |
| | | | | 343/702 |
| 2015/0077551 | A1* | 3/2015 | Simeroth | H04N 7/183 |
| | | | | 705/26.61 |
| 2017/0187945 | A1* | 6/2017 | Ikeda | H04N 23/667 |
| 2018/0376074 | A1* | 12/2018 | Gumpert | H04N 23/66 |
| 2020/0327315 | A1* | 10/2020 | Mullins | G06V 20/52 |
| 2022/0115137 | A1* | 4/2022 | Goldstein | G16H 10/60 |

* cited by examiner

*Primary Examiner* — Samira Monshi

(57) ABSTRACT

The present invention generally pertains to a motion sensing camera for monitoring and photographing wildlife and more specifically pertains to such a wildlife camera with optical zoom capability that allows one to photograph game animals from a greater distance, reducing the likelihood of alarming game animals being photographed/filmed. The wildlife surveillance camera also optionally comprises EMF and/or RF shielding material that substantially reduces the electromagnetic field generated by said camera.

19 Claims, 1 Drawing Sheet

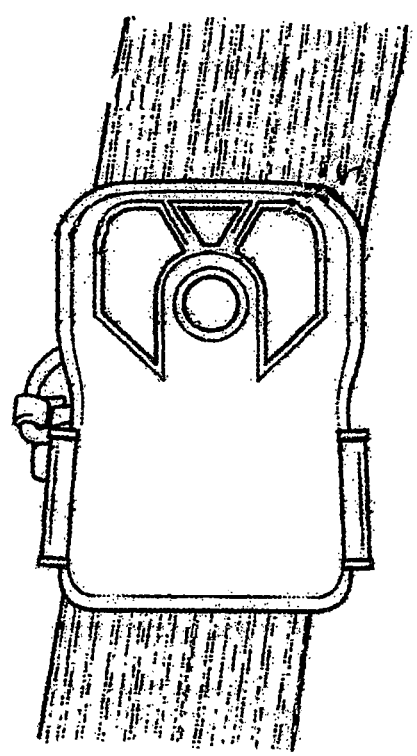

WILDLIFE CAMERA WITH OPTICAL ZOOM CAPABILITY

FIELD OF THE INVENTION

The present invention generally pertains to motion sensing cameras for remotely monitoring and photographing wildlife and more specifically to a wildlife camera with optical zoom capability that allows one to photograph wildlife from a greater distance, thereby reducing the chances of alarming said wildlife.

BACKGROUND OF THE INVENTION

There are a wide variety of wildlife cameras for use in a variety of activities. Wildlife observation cameras are usually left unattended in an area where wildlife is expected, and a motion detector is often used for triggering the camera when an animal appears. Wildlife cameras typically include a motion detector or some other camera-triggering device; weather protection; an illuminating flash or infrared flash for taking pictures at night; and logic for adjusting the camera's function under changing conditions such as daylight, temperature, and size of animal and/or speed of animal.

Every electronic device, including cameras and cell phones, generate electromagnetic ("EM") energy. Research suggests animals can sense the electromagnetic field (EMF) produced by such devices. An abundance of other research has been conducted regarding how animals react to EMF. Grazing deer and cattle are known to generally align themselves with geomagnetic north and south. But when the animals encountered EMF created by high-tension power lines, their ability to align themselves is interrupted. Although it can be proven that mammals sense and react to EMFs, scientists aren't sure exactly how. Sharks and some other fish have special organs specifically designed to pick up electromagnetic impulses, and many birds rely heavily on magnetic fields to guide their annual migrations. A corresponding mechanism has yet to be discovered in game animals such as deer and elk, but a popular theory is that some animals may perceive magnetic fields as visual patterns. This could explain the mysterious sixth sense that bucks are believed to have. In fact, many seasoned hunters believe that deer are actually spooked by wildlife cameras, and especially those that transmit photos wirelessly, because the can sense the EM field generated by such devices.

It is therefore an object of the present invention to improve on the state of the art by providing a wildlife camera having optical zoom capabilities which allows one to place said camera a greater distance from the wildlife to be filmed/photographed. By placing the camera a greater distance away, the likelihood that the game camera will be detected by wildlife, and particularly deer, being photographed and/or filmed, is greatly diminished. Additionally, the game cameras of the invention optionally comprise Radio Frequency (RF) and/or Electromagnetic Radiation (EMR) dampening materials further reducing the likelihood of detection by wildlife.

SUMMARY OF THE INVENTION

The present invention generally pertains to motion sensing cameras for remotely monitoring and photographing wildlife and more specifically pertains to such a camera that includes optical zoom capability that allows one to place said camera a greater distance away from the game to be photographed and/or filmed. Additionally, the game cameras of the invention optionally comprise Radio Frequency (RF) and/or Electromagnetic Radiation (EMR) dampening materials further reducing the likelihood that the wildlife camera of the invention will be detected by the wildlife being photographed.

DETAILED DESCRIPTION OF THE FIGURES

FIG. 1 depicts the wildlife or trail camera of the invention attached to a tree.

DETAILED DESCRIPTION OF THE INVENTION

Wildlife cameras as used herein means any photo or video recording device with can be left in areas frequented by wildlife. They are generally battery or solar powered and store photos and/or videos on a hard drive, SD card or other recording device, or they can transmit photos and/or video through WiFi and/or cellular. Such wildlife cameras can also be adapted to transmit photos and/or videos wirelessly. The present invention relates to a wildlife camera having optical zoom lens capabilities. An optical zoom is a true zoom lens, like the zoom lens employed in a conventional camera. Zoom lenses produce much better-quality images, especially in situations where the camera is placed a greater distance away from the wildlife being photographed. The optical zoom of the game cameras of the invention is generally at least 2× but can be as much as 25× or more. More specifically, the user can set the optical zoom at a preset magnification, i.e., for example 4×, depending on how far the camera is set from the game trail/wildlife to be photographed. This allows the user to place the game camera further away from the wildlife to be photographed and/or filmed, in some instances as far as 25 to 250 feet or more away from the game to be filmed/photographed. At extreme distances the wildlife camera of the invention can be paired with a remote motion sensor that triggers operation of the camera through, for example, bluetooth communication.

There are two basic ways of zooming in photography: optical zoom and digital zoom. Game cameras in the market today have digital zoom capabilities. A digital zoom is simply means that the camera has in-camera image processing capabilities. When you use a digital zoom, the camera enlarges the image area at the center of the frame and trims away the outside edges of the picture. The result is the same as when you open an image in your photo-editing program, crop away the edges of the picture, and then enlarge the remaining portion of the photo. It is useful to think of digital zoom as photo-processing software built into your camera. By enlarging pixels in the center of the photo and cropping out the rest, digital zoom gives the appearance of magnifying the subject, while also lessening resolution and image quality. However, game cameras with digital zoom generally have to be placed closer to the game animals being photographed because when placed further away photo quality is greatly diminished when digital zoom is employed, i.e., the pictures tend to be grainy with poor resolution. Additionally, since digital zoom game cameras generally need to be placed closer to the game animals being photographed, they more easily alert and/or spook game animals when activated because of the noise, emissions, flash illumination and/or IR flash. Optical zoom leverages the physical change in a lens to adjust the distance between camera sensor and subject, whereas digital zoom uses magnification technology to enlarge an area of an image, thereby compromising the integrity of the picture by cutting down on the megapixels.

The wildlife camera of the present invention that utilize optical zoom lenses overcome many the deficiencies of conventional digital zoom wildlife cameras. More specifically, optical zoom game cameras allow one to place game cameras further away from game animals being photographed without sacrificing photo quality at those distances. Additionally, by placing the cameras a greater distance away from the game animals to be photographed, the optical zoom game cameras of the invention are far less likely to spook game animals when activated.

Optical zoom involves a physical camera lens movement, which changes the apparent closeness of the image subject by increasing the focal length. To zoom in, the lens moves away from the image sensor, and the scene is magnified. Optical lenses zoom by moving the camera sensor further away from the lens, effectively giving the sensor a smaller (and more close up) field of vision. The amount by which you can do this depends on the focal length your camera is capable of. The zoom ratio figure (such as 30×, 36×, 44×, etc) is simply the difference between the shortest and the longest focal point of a lens. To get to the ratio, all one has to do is divide the maximum focal length of a lens by its minimum focal length. For instance, a camera with a lens that features a 150-600 mm focal length. The zoom ratio of this lens would be 600÷150=4×.

Another factor that will impact zoom capability is camera resolution. Cameras with higher resolutions will yield better quality zoomed-in footage. Because of this, a camera with a 30× zoom ratio and a high resolution could potentially have similar zoom capabilities as a camera with a 50× zoom ratio with lower resolution. The wildlife camera of the invention not only possesses a variety of optical zoom capabilities, it also possesses the highest resolution offered in a wildlife camera.

The advantage of the wildlife camera of the invention having optical zoom is versatility. They are ideal for use in situations where the user desires to photograph game at greater distances. The optical zoom camera of the invention enables the user to vary focal lengths without having to change lenses, making them very functional. In fact, the game camera of the invention allows the user to preset optical zoom anywhere from 2× up to 10× and more. Higher zoom capabilities up to 50× are also possible. The user can set the optical zoom at a preset magnification, i.e., for example 4×, depending on how far the camera is to be set from the game trail to be photographed. This allows the user to place the game camera further away from the game to be photographed and/or filmed, in some instances as far as 25 to 150 feet or more away from the game to be filmed/photographed. By placing the camera a greater distance away from the intended target, the game camera of the invention is far less likely to be detected and/or spook game animals when activated due to noise, EM and/or RF emissions and/or illuminating and/or infrared flash.

The optical zoom lens surface and/or the surface of the illuminating and/or infrared flash are optionally subjected to an anti-reflective and/or glare treatment. Said treatment can be by sandblasting, anti-reflective and/or anti-glare coating, or by any other means within the purview of one of ordinary skill in the art. The optical zoom lens can also be polarized in order to minimize glare and/or hazing.

In order to further reduce the likelihood of detection the wildlife cameras of the invention optionally also comprise Radio Frequency (RF) and/or Electromagnetic Radiation (EMR) dampening or shielding materials that reduce the likelihood that those emissions will be detected by game animals.

A photon is energy. Photons can carry varying degrees of energy. The amount of energy photons carry affects their behavior. Photons with low energy travel together as "waves" while groups of photons with a higher degree of energy behave like "particles". The higher the energy of these photons, the easier they are to detect and the more dangerous they become. Electromagnetic Radiation (EMR) is comprised of traveling photons. Since the behavior of the photons varies with their associated energy level, so does the level of EMR.

The lowest energy waves in the electromagnetic spectrum are referred to as Extremely Low Frequency (ELF) and with a little bit more energy, radio waves. The highest energy waves in the electromagnetic spectrum are called gamma rays. Gamma rays can penetrate and kill cells; sometimes they are used for cancer treatment. Without the proper EMF protection, you can be harmed by gamma rays. The Extremely Low Frequency (ELF) and radio waves in contrast with the gamma waves represent the other end of the electromagnetic spectrum. The lowest end of the spectrum are considered non-thermal and thermal emissions that initiate low and high current.

Electronic devices such as wildlife cameras, especially those that are equipped with WiFi or cellular capabilities for sending photos and videos wirelessly, generate levels of ELF, Radio Frequency (RF) and/or Electromagnetic Radiation (EMR). Studies have found that fresh deer beds in the snow faced in a magnetic north-south direction, much more often than other direction. Other studies have also that animals can 'sense' electromagnetic radiation. Other animals use electromagnetic radiation to migrate. There is no question that animals sense electromagnetic radiation, and no question that electronic devices such as wildlife cameras give such radiation off. And when animals can sense the EM field/radiation generated by electronic devices, such as wildlife cameras, there is an increased incidence of said animals becoming aware of and/or being alarmed by such devices. That may cause the animals to actually avoid the area in which the wildlife camera is located.

The present invention obviates many of the aforementioned deficiencies by providing a wildlife camera with optical zoom capabilities and optional electromagnetic and/or radio frequency shielding. Electromagnetic shielding reduces the electromagnetic field in a space by blocking the field with barriers made of conductive or magnetic materials. Shielding is typically applied to enclosures to isolate electrical devices from their surroundings which, when combined with optical zoom allows one to place the game cameras a greater distance away from the game animals reducing the probability that said cameras will be detected by the game being photographed and/or filmed. In one embodiment of the invention, the electromagnetic shielding also comprises RF shielding that blocks radio frequency electromagnetic radiation.

EMF shielding reduces the coupling of radio waves, electromagnetic fields and electrostatic fields. Shielding material reflects the radiations, conducting materials like metals can also be used but they are bulky, so any material which shows some conductivity and is flexible can be used as a material for shielding like flexible graphite etc. A conductive enclosure can also be used to block electrostatic fields, also known as a Faraday cage, which is included within the definition of EMF shielding herein. The amount of reduction depends very much upon the material used, its thickness, the size of the shielded volume and the frequency of the fields of interest and the size, shape and orientation of apertures in a shield to an incident electromagnetic field.

Electromagnetic shields help block EMFs with barriers made of conductive or magnetic materials that can block EMFs from wildlife cameras or other recording devices. These materials can be used to wrap or cover the devices to greatly reduce magnetic field emissions. If testing a wildlife camera or recording device for EMF protection one can use an EMF meter to measure EMFs before and after the use of the EMF shielding. This ability to measure EMFs helps measure the benefits of EMF shielding.

Shielding fabrics designed electronic devices, including wildlife cameras and other recording devices can also be employed. These fabrics will typically soften the EMF signal, but usually do not completely block it.

Typical materials used for electromagnetic shielding include sheet metal, metal screen, and metal foam. Any holes in the shield or mesh must be significantly smaller than the wavelength of the radiation that is being kept out, or the enclosure will not effectively approximate an unbroken conducting surface.

Another commonly used shielding method, especially with electronic goods housed in plastic enclosures, is to coat the inside of the enclosure with a metallic ink or similar material. The ink consists of a carrier material loaded with a suitable metal, typically copper or nickel, in the form of very small particulates. It is sprayed on to the enclosure and, once dry, produces a continuous conductive layer of metal, which can be electrically connected to the chassis ground of the equipment, thus providing effective shielding.

RF shielding enclosures filter a range of frequencies for specific conditions. Copper is used for radio frequency (RF) shielding because it absorbs radio and electromagnetic waves. Properly designed and constructed copper RF shielding enclosures satisfy most RF shielding needs for wildlife cameras.

Electromagnetic radiation consists of coupled electric and magnetic fields. The electric field produces forces on the charge carriers (i.e., electrons) within the conductor. As soon as an electric field is applied to the surface of an ideal conductor, it induces a current that causes displacement of charge inside the conductor that cancels the applied field inside, at which point the current stops.

Similarly, varying magnetic fields generate eddy currents that act to cancel the applied magnetic field. (The conductor does not respond to static magnetic fields unless the conductor is moving relative to the magnetic field.) The result is that electromagnetic radiation is reflected from the surface of the conductor: internal fields stay inside, and external fields stay outside.

Several factors serve to limit the shielding capability of real RF shields. One is that, due to the electrical resistance of the conductor, the excited field does not completely cancel the incident field. Also, most conductors exhibit a ferromagnetic response to low-frequency magnetic fields, so that such fields are not fully attenuated by the conductor. Any holes in the shield force current to flow around them, so that fields passing through the holes do not excite opposing electromagnetic fields. These effects reduce the field-reflecting capability of the shield.

Although the choice of EMF shielding material is not limiting in the context of the invention, there are several commercially available materials that are particularly useful. Pre-tin plated steel is an ideal, low cost solution that works well from lower frequencies in the kHz range through frequencies into the lower GHz range. Carbon steel has a permeability value in the lower hundreds range which provides the low-frequency magnetic shielding property that is missing in alloy 770, copper, or aluminum.

Copper alloy 770, more commonly known as alloy 770, is a copper, nickel, zinc alloy used in EMF shielding applications mainly for its corrosion resistant properties. The alloy's unified numbering system designation is UNS C77000. The base material is inherently aesthetic and does not require post plating to make it corrosion resistant or solderable. The material works well as an EMF shield beginning in the mid kHz range up into the GHz.

Copper is the most reliable metal in EMF shielding because it is highly effective in attenuating magnetic and electrical waves. Due to the versatility of this metal it can be easily fabricated along with its alloys brass, phosphorous bronze, and beryllium copper. These metals typically cost more than the alternative shielding alloys of pre-tin plated steel or copper alloy 770 but, on the other hand, offer a higher conductivity. Phosphorous bronze and beryllium copper are more commonly used in contact applications for batteries or springs due to their elasticity.

Although aluminum does pose a few fabrication challenges, it is still an excellent choice for a number of applications mostly due to its non-ferrous properties, its strength-to-weight ratio, and its high conductivity. Aluminum has nearly 60 percent of conductivity when compared with copper, however, using this metal needs precise attention to its galvanic corrosion and oxidation properties. The shielding system described in U.S. Pat. No. 11,122,189, which is incorporated herein by reference, can be usefully employed in the wildlife camera of the invention.

The camera disclosed herein also optionally comprises a versatile mounting system for facilitating securement of a camera to a supporting structure, such as a tree, without being restricted or limited by the angle at which the supporting structure or tree (or other supporting structure, such as a post, wall, sticks, or the like) extends. The camera mounts described herein provide the supported camera with a plurality of different available orientations or angles relative to the supporting structure. The disclosed camera mounts are easy to assemble and disassemble, that are less complex and costly and that are compact so as to better hug or follow the profile of the tree or supporting structure so as to be less conspicuous to the wildlife being observed.

The disclosed camera mounts optionally comprise a base member having a rear face to face a support structure and a front face, the front face a curved guide surface, a camera support having a rear face facing the front face of the base member, the rear face of the camera support comprising a guide abutting surface and a spring resiliently biasing the guide abutting surface against the curved guide surface to releasably retain the camera support at one of a plurality of different positions along the curved guide surface and at one of a plurality of different available orientations relative to the support structure.

The versatile mounting system optionally comprises a ball or a portion of a ball and a socket having a minority spherical surface that receives the ball or the portion of the ball, wherein the ball or the portion of the ball rotates within the socket to allow a camera support to be positioned at a selected one of a plurality of available positions and orientations. For purposes of this disclosure, a "minority spherical surface" refers to a spherical surface (concave or convex) that is equal to or less than one half of a sphere (less than equal to a semi-spherical surface). One example of a minority spherical surface is a semi-spherical surface. In the form of a socket, the minority spherical surface does not wrap around the ball or portion of the ball such that the ball may be easily withdrawn from the socket. The smaller size of the socket provides a reduced thickness. Likewise, in implementations where the ball is less than an entire ball, such as a semi-spherical ball, the ball has a reduced thickness.

The ball and the socket of the aforementioned mounting system can be held in a nested position by a variety of retaining means. In one embodiment, a spring can be used as a retaining means keeping the ball and socket in a nested relationship even in situations where the socket is a minority spherical surface not wrapping about opposite portions of the ball or not capturing the ball. Reducing the thickness of the interface between the camera support and the base may allow the camera mount to more closely hug or align with the profile of the tree or supporting structure such that the camera is less conspicuous to wildlife being observed. Other retaining means can also be employed including retaining tabs, male and female retaining slots, etc. One example of a mounting system that can be usefully employed with the camera of the invention is described in U.S. Pat. No. 10,834,916 which is incorporated herein by reference.

It is a particular problem when placing trail cameras that users are unsure where their camera lens is aimed. Often, hunters need to take trial pictures and adjust the camera position repetitively until the intended target is acquired. The camera of the invention optionally comprises communication means that allows the camera to communicate in real time to a remote viewer, such as a phone or display screen, which can be used to aid the user in aiming the camera towards the desired target. For example, a user can aim the camera lens, and walk remotely, holding phone, and stand in position of the target, and adjust the camera accordingly. Wireless communication couples the camera unit to the remote viewer.

In another embodiment the camera of the invention is equipped with a laser pointer/targeting means that assists the user in aiming the camera to the intended target area. More specifically, the laser is and the camera's lens are configured to point to the same target area and move in unison. When activated the laser is pointed to the desired target area, thereby pointing/aiming the camera to accurately to the same target area.

The camera system of the invention, in addition to at least one optical zoom lens, can also comprise data storage means (for instance, an SD card carried in said card slot) coupled to said camera, a wireless connection (e.g., a WiFi and/or cellular connection) between said camera and a remote viewer such as a phone, laptop and the like, said remote viewer displaying a field of view of said camera lens, optionally a virtual aim point, in one embodiment an illuminated aim point on said remote viewer, said viewer simultaneously displaying said field of view of said camera lens. Remote viewer can be configured to communicate control signals to said camera to control said lens by at least one of a optical zoom control, a vertical translation control and a horizontal translation control. Such control on the phone/display can be through swipes or pinches on the screen of phone/display, and those can either adjust field of view electronically, or by physically or mechanically actuating the camera by either manipulating the aim point by moving the camera by hand or by internal motor. In use, a user of the phone can retrieve images from data storage on camera by initiating a wireless download sequence, for instance by an app provided on phone.

In one embodiment the optical zoom lens of the camera of the invention can be zoomed remotely through use of, for example, a smart phone with the relevant app. The result is a photo of animal from the camera in the intended zone at the desired zoom level. Data including pictures, can be wirelessly uploaded from camera to phone using wireless connection.

An app provided on phone controls the camera of the invention in ways not achieved by the prior art. For instance, there is no way that prior art cameras show in real time a remote display of the intended target zone and the ability to adjust the appropriate optical zoom to the target. This aiming point is visible remotely by carrying phone to the intended aiming point. This feature is particularly useful for aiming up and down hills, or for further out ranging of intended targets, where matching target and aim point would otherwise be difficult.

Although the invention is described with reference to a preferred embodiment, it should be appreciated by those of ordinary skill in the art that various modifications are well within the scope of the invention. Therefore, the scope of the invention is to be determined by reference to the following claims.

The invention claimed is:

1. An optical game camera for remotely photographing wildlife, said camera consisting essentially of motion detection means, an optical zoom lens, communication means and a mounting system for securing said camera to a supporting structure wherein said communication means is configured to allow said camera to communicate in real time with a remote viewer to aid in aiming the camera towards the desired target zone.

2. The optical game camera of claim 1 wherein said optical zoom lens is adjustable to a preset magnification of from 2× to 20×.

3. The optical game camera of claim 1 wherein said optical zoom lens automatically adjusts magnification depending on the distance of the wild animal being photographed.

4. The optical game camera of claim 1 wherein said remote viewer is selected from a cell phone, laptop or display screen and said communication means communicates with said remote viewer through a WiFi or cellular connection.

5. The optical game camera of claim 4 wherein said remote viewer is a cell phone, wherein said cell phone comprises an app configured to display of the intended target zone to aid in aiming the camera to said desired target.

6. The optical game camera of claim 5 wherein said app is configured to remotely adjust said camera's aim point and/or optical zoom magnification.

7. The optical game camera of claim 1 further comprising data storage means optionally configured to communicate data from said data storage means to said remote viewer through a WiFi or cellular connection.

8. The optical game camera of claim 7 wherein said data storage means is a hard drive or SD card.

9. The optical game camera of claim 1 which comprises an illuminating flash or infrared flash.

10. The optical game camera of claim 1 comprising an optical lens having a magnification of from 2×up to 10×.

11. The optical game camera of claim 10 comprising a 2×optical lens.

12. The optical game camera of claim 10 comprising a 4×optical lens.

13. The optical game camera of claim 10 comprising a 10×optical lens.

14. An optical game camera for remotely photographing wildlife, said camera comprising motion detection means and an optical zoom lens, wherein said camera comprises communication means configured to allow said camera to communicate in real time with a remote viewer to aid in aiming the camera towards the desired target, said camera operable in a real time mode and/or a picture or video taking mode; a camera support housing carrying said camera; a camera mount coupled to said camera support housing, wherein said mount comprises a base member having a rear face and a front face; said rear face facing the front face of the base member, the rear face of the camera mount comprising a guide abutting surface; and said front face comprising a curved guide surface to position said camera at any position within the range permitted by the curvature of said guide surface; a retainer holding the guide abutting surface against said curved guide surface to releasably retain said camera mount; data storage coupled to said camera; a wireless connection between said camera and a remote viewer; said remote viewer displaying a field of view of said lens, and optionally displaying photographs transmitted across said wireless connection; a virtual aim point optionally illuminated on said remote viewer, said viewer simultaneously displaying said field of view of said lens; and securing means for securing said camera mount to a supporting structure, wherein the mount releasably retains the camera support at one of a plurality of different positions along the curved guide surface and at one of a plurality of different available orientations relative to the support structure.

15. The optical game camera of claim 14 wherein said remote viewer communicates control signals to the optical lens of said camera by at least one of a zoom control, a vertical translation control and a horizontal translation control.

16. The optical game camera of claim 14 wherein said optical zoom lens is adjustable to a preset magnification of from 2× to 20×.

17. The optical game camera of claim 14 wherein said remote viewer is selected from a cell phone, laptop or display screen and said communication means communicates with said remote viewer through a WiFi or cellular connection.

18. The optical game camera of claim 17 wherein said remote viewer is a cell phone, wherein said cell phone comprises an app configured to display of the intended target zone to aid in aiming the camera to said desired target.

19. An optical game camera for remotely photographing wildlife, said camera consisting essentially of motion detection means, an optical zoom lens, laser targeting means and a mounting system for securing said camera to a supporting structure.

* * * * *